United States Patent [19]
Farinelli et al.

[11] Patent Number: 5,363,434
[45] Date of Patent: * Nov. 8, 1994

[54] AUDIO DISTRIBUTION SYSTEM

[75] Inventors: Robert Farinelli; Bruce B. Stevenson; Bill R. Unseld, all of Lexington, Ky.

[73] Assignee: Square D Company, Palatine, Ill.

[*] Notice: The portion of the term of this patent subsequent to Jul. 14, 2009 has been disclaimed.

[21] Appl. No.: 818,664

[22] Filed: Jan. 9, 1992

Related U.S. Application Data

[63] Continuation-in-part of Ser. No. 639,507, Jan. 9, 1991, Pat. No. 5,131,048.

[51] Int. Cl.⁵ .......................................... H04R 27/00
[52] U.S. Cl. ................................... 379/170; 379/171; 381/81; 381/85
[58] Field of Search ............... 379/159, 170, 171, 167, 379/103; 381/81, 85; 455/174.1

[56] References Cited

U.S. PATENT DOCUMENTS

| | | | |
|---|---|---|---|
| 3,978,468 | 8/1976 | Bond et al. | 379/103 |
| 4,113,986 | 9/1978 | Clement et al. | 379/103 |
| 4,554,411 | 11/1985 | Armstrong | 379/103 |
| 4,987,589 | 1/1991 | Trell | 379/103 |
| 5,131,048 | 7/1992 | Farenelli et al. | 381/81 |

*Primary Examiner*—Stephen Chin
*Assistant Examiner*—Paul Loomis
*Attorney, Agent, or Firm*—Larry I. Golden; Kareem M. Irfan

[57] ABSTRACT

A signal distribution and communication arrangement controls the broadcast of different types of signals through speakers located in various zones. The system includes a telephone interfaced with a door speaker controller to allow communication between the telephone and a door speaker. A page may be broadcast over the speakers and subsequently muted to allow private communication when the page is answered. Also included is a doorbell interface circuit that responds to a doorbell source. The doorbell source may be activated by any one of a plurality of doorbell switches.

24 Claims, 12 Drawing Sheets

AUDIO DISTRIBUTION SYSTEM

REFERENCE TO RELATED APPLICATION

The present application is a continuation-in-part of U.S. application Ser. No. 07/639,507 filed Jan. 9, 1991, U.S. Pat. No. 5,131,048.

FIELD OF THE INVENTION

The present invention relates generally to audio distribution systems and, more particularly, to circuit arrangements for integrating various types of signals in audio distribution systems.

BACKGROUND OF THE INVENTION

Home owners are rapidly becoming aware of the benefits of home audio distribution systems. These benefits include convenient access to audio signals throughout the home, more efficient use of space and savings in the form of fewer system components.

Audio distribution systems range from those distributing stereo signals only, to those incorporating other functions such as doorbells and intercoms. These systems frequently utilize a switching matrix to distribute a signal, generated and amplified by a stereo system, to various rooms throughout the house. Speakers in the various rooms typically receive the amplified signal through a distribution panel co-located in the room with the stereo system.

Prior art systems offering integrated functions such as distribution of stereo, doorbell and intercom signals have several setbacks. For example, many of these prior art systems seeking to improve sound quality have utilized the home owner's high power stereo system and a switching matrix to distribute a pre-amplified stereo signal. Unfortunately, these systems are unable to effectively integrate other important features, such as doorbell and paging.

Another setback of prior art systems is the inconvenience of using the intercom. These systems typically have the page button and speaker/receiver located on the audio distribution wall unit. This requires the intercom user to go to the location of the intercom system, as opposed to accessing it from a more convenient location.

Accordingly, there is a need for an audio distribution system that can be implemented without the aforementioned shortcomings.

SUMMARY OF THE INVENTION

A general object of the present invention is to provide a signal distribution and communication arrangement which overcomes the above deficiencies.

Another object of the present invention is to provide an arrangement for controlling the broadcast of a plurality of different types of signals through speakers located in various zones, using a control circuit which responds to various signal interface circuits by selecting which of the music, audio, page and doorbell signals from the interface circuits should be broadcast through the speakers.

Still another object of the present invention is to provide an arrangement for a front door intercom, a telephone extension conferencing circuit and an incoming telephone line hold circuit that is activated through any home touch tone telephone extension by dialing a code on the telephone handset.

The present invention is a signal distribution and communication arrangement for controlling the broadcast of a plurality of different types of signals through speakers located in various zones. The system includes a telephone interfaced with a door speaker controller to allow communication between the telephone and a door speaker. A page may be broadcast over the speakers and subsequently muted to allow private communication when the page is answered. Also included is a doorbell interface circuit that responds to a doorbell source. The doorbell source may be activated by any one of a plurality of doorbell switches.

In one preferred embodiment, these and other objects of the present invention are realized using a signal distribution and communication arrangement for controlling the broadcast of a plurality of different types of signals through speakers located in various zones. The arrangement includes an audio receiver for receiving a substantially continuously generated signal. A tone generator circuit is employed to respond to at least one doorbell generator signal from either a lighted or non-lighted doorbell button. The tone generator circuit produces one of two separate tone sequences. The arrangement also employs a home telephone interface circuit that will permit access to a front door intercom from any home extension by the dialing of a touch tone code. Similarly, a door latching circuit can be activated from any home extension by dialing a touch tone code. Telephone calls may be placed on hold by dialing another predetermined code. A paging interface circuit can be accessed from any home extension by dialing a different touch tone code. An amplifier circuit is coupled to speakers and slave amplifiers to amplify the substantially continuously generated signal, the predetermined tone and the page signal. A control circuit prioritizes, selects and couples the substantially continuously generated signal, the predetermined tone and the page signal to the amplifier circuit for broadcast through the speakers.

BRIEF DESCRIPTION OF THE DRAWINGS

Other objects and advantages of the invention will become apparent upon reading the following detailed description and upon reference to the drawings in which:

FIG. 7(A-B) is a circuit diagram illustrating a preferred embodiment of a control circuit used to implement the threshold detection, mute and audio signal output pre-amplification functions of FIG. 4;

While the invention is susceptible to various modifications and alternative forms, a specific embodiment thereof has been shown by way of example in the drawings and will be described in detail. It should be understood, however, that it is not intended to limit the invention to the particular form described. On the contrary, the intention is to cover all modifications, equivalents and alternatives falling within the spirit and scope of the invention as defined by the appended claims.

DESCRIPTION OF THE PREFERRED EMBODIMENTS

Figure 1:
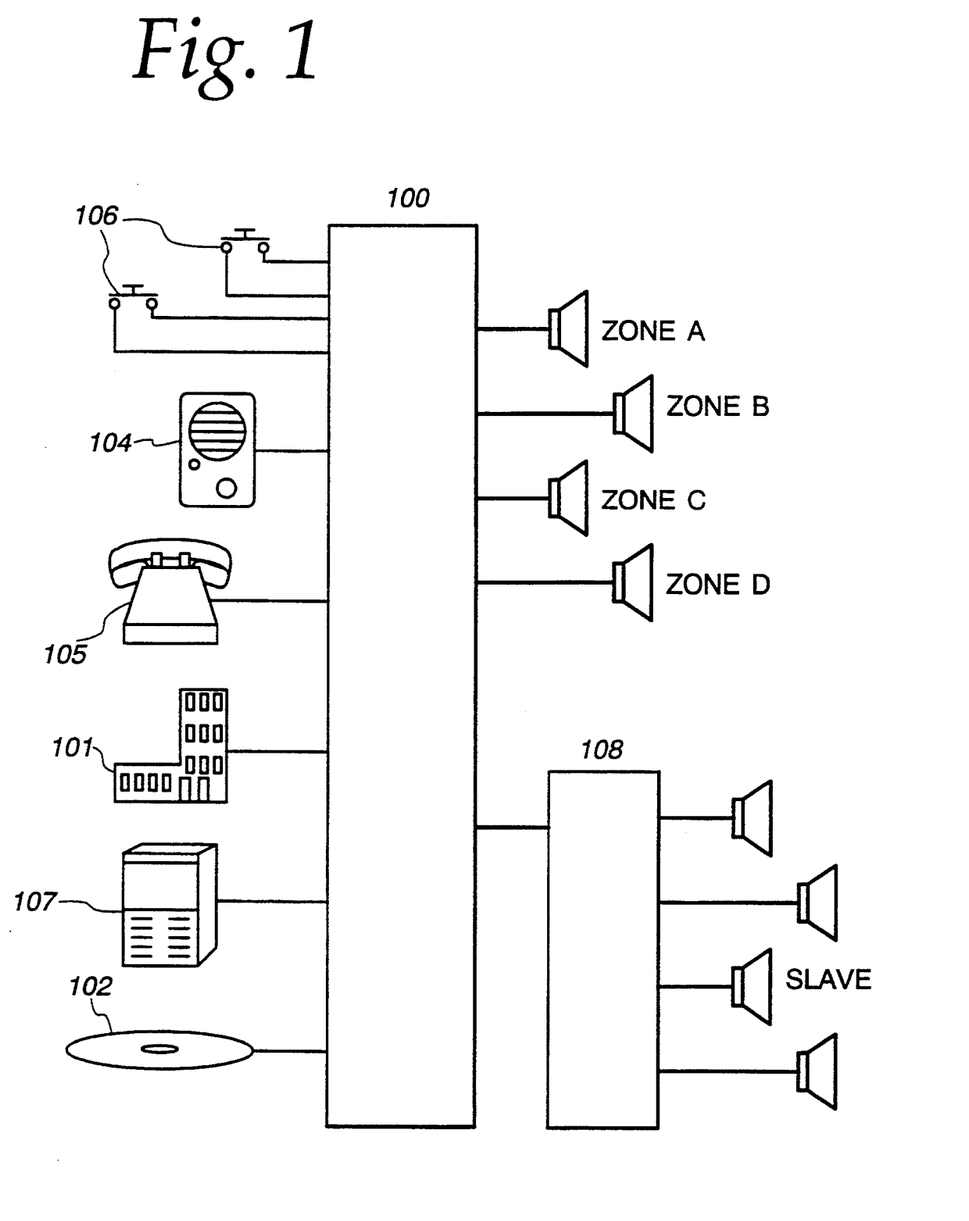
FIG. 1 is a block diagram of an audio distribution amplifier system, according to the present invention.

FIG. 1 illustrates the basic configuration of the present invention in a typical application. The audio distribution amplifier (ADA) system 100 receives as inputs left and right line level signals from the home owner's personal stereo 102, substantially continuously generated audio signals from the incoming telephone line 101, a telephone handset 105, a home owner's personal key system 107, a door speaker controller 104 or an intermittently generated doorbell signal from at least one doorbell source. The doorbell source may be activated by doorbell switches 106. The ADA system 100 generates, as outputs to speakers located in a plurality of different zones A-D and a slave ADA 108, any of the following: (1) a triple or dual tone doorbell signal for which switch activated the doorbell source; (2) a voice paging message originating by dialing a predetermined code on the telephone handset 105; (3) through the key system 107 after a page command is initiated; or (4) amplified left and right stereo signals corresponding to line level signals received from the homeowner's personal stereo 102. The present system will also be interfaced with a door speaker controller 104 to allow communication between the door speaker controller 104 and the telephone handset 105 when a predetermined code is dialed on the telephone handset 105.

Other predetermined codes may be pressed to mute the output of the ADA 100 when the page is answered to allow a private conversation. To accomplish this, the muted page prevents the conversation from being broadcast over the remainder of the paging system. Other functions that can be accomplished include operation of a door latching device through the door speaker controller 104 and placing a call on hold to permit the call to be picked up from another telephone location.

Figure 2:
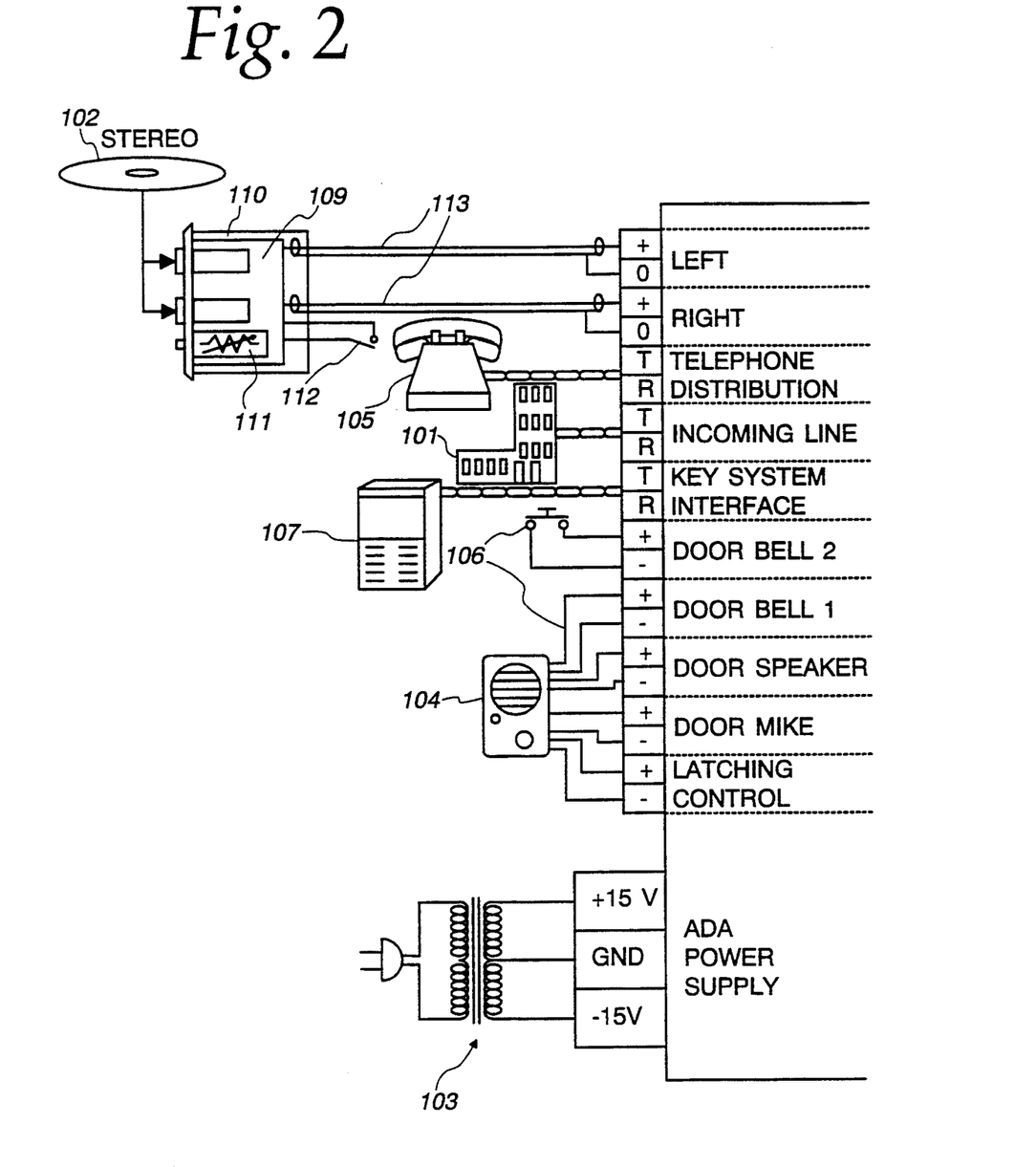
FIG. 2 is a diagram illustrating, in more detail, various inputs to the audio distribution amplifier system of FIG. 1.

The interface between the ADA system 100 and the output of the stereo 102 is illustrated in FIG. 2. The interface includes a wall plate interface circuit 110 which receives and buffers left and right signals from a typical consumer music system, such as a stereo amplifier or radio receiver 102. The range of stereo output signal levels and impedances is preferably from 0.1 V to 1.0 V (peak to peak) and 10 kΩ to 100 kΩ, respectively. A remote master gain control 111 (FIG. 2) in the wall plate interface circuit 110 (mounted on printed circuit board 109, shown in FIG. 2) provides volume control. Ideally, the wall plate interface circuit 110 and the gain control 111 are located near the associated stereo so that the stereo signal may be properly distributed without degradation.

The interface illustrated in FIG. 2 also includes a remote stereo defeat control switch 112 which disables the stereo signals presented to the ADA system 100 when closed. When the defeat control switch is open, the left and right signals from the stereo 102 are delivered to the ADA system 100 via two signal cables 113. Each signal cable preferably consists of a single 22 A.W.G. conductor with a bell foil shield and drain wire. The cable lengths are desirably between 20 and 200 feet.

FIG. 2 also illustrates the incoming telephone line 101, which is connected to the telephone handset 105 through the ADA 100. Whenever a telephone feature is activated by dialing a predetermined code on the telephone handset 105, a hold function is applied to the telephone to prevent disconnection of an active conversation.

In a preferred embodiment, a communications module 192 (FIG. 4) monitors a continuously generated signal to detect when the telephone handset is taken "off hook." This monitoring function also detects appropriate predetermined codes used to activate paging, muting, door intercom, latching and hold features. When a predetermined code is dialed by the user, the communications module 192 performs the functions necessary to permit the handset to be used to page, hold a private conversation with another handset, converse with someone at the door speaker controller 104, operate a latching device from the door speaker controller 104 or put the incoming telephone line 101 on hold.

An interface is provided for the homeowner's personal key system 107, which can initiate a paging signal. In the preferred embodiment, the key system 107 activates the interface by presenting a continuously generated signal and the ADA 100 responds by activating the paging control circuit to permit the key system 107 to be used for paging.

An interface is provided for the door speaker controller 104 so that the telephone handset 105 can be used to converse with someone at the door intercom location and operate a latching device associated with the door speaker controller 104. Whenever a door button 106 on the door speaker controller 104 is pressed, a multiple tone is broadcast over the paging system. Upon taking the telephone handset "off hook" and dialing the predetermined code to access the door speaker controller 104, the communications module 192 places the incoming telephone line 101 on hold and connects the telephone handset 105 to the door speaker controller 104, allowing the user to converse with someone at the door intercom location. While the connection is completed between the telephone handset 105 and the door intercom unit, the user can dial a predetermined code to activate a door latching device associated with the door speaker controller 104 through the telephone handset 105.

Power to the ADA system 100 may be provided using a conventional AC domestic power source (not shown) and a transformer 103 providing +15 V and −15 V AC power levels to the ADA system 100.

Power to the wall plate interface circuit is provided by a power supply in the ADA 100 (wires not shown).

Figures 3, 4:
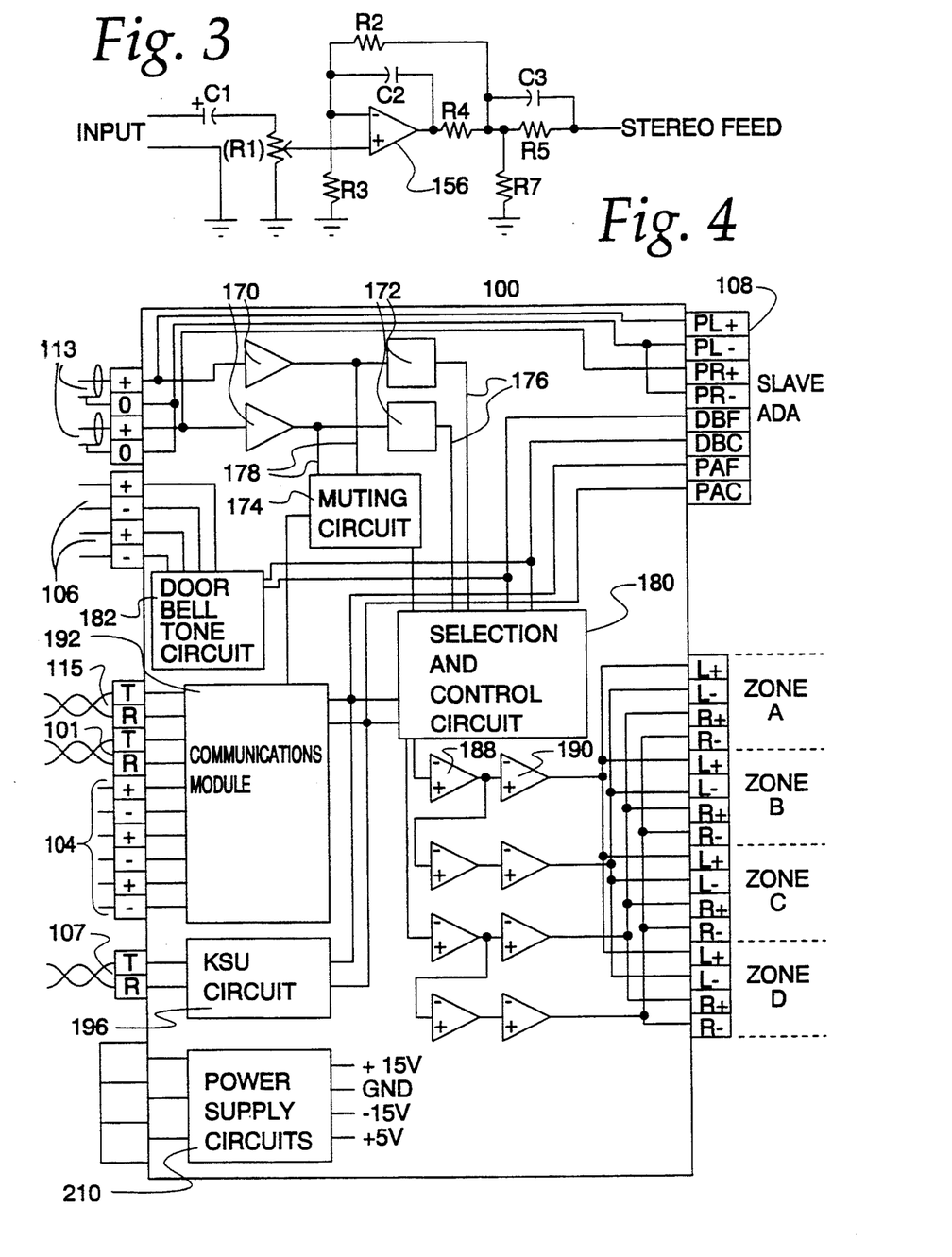
FIG. 3 is a circuit diagram illustrating a preferred embodiment of one of two identical wall plate interface circuits, in accordance with the present inventions, which may be used as a buffer between the stereo system and the audio distribution amplifier of FIG. 2.
FIG. 4 is a block diagram, according to the present invention, illustrating the basic functional circuits internal to the audio distribution amplifier of FIG. 2.

Referring now to FIG. 3, there is illustrated one of two identical wall plate interface circuits which may be used for converting and buffering a respective one of the left or right stereo signals from a single-ended to a balanced signal. The circuit includes a conventionally arranged stereo feed amplification circuit based around a TL074-type operational amplifier 156. The resistor and capacitor values in the circuit of FIG. 3 may be implemented using typical values well-known in the art.

FIG. 4 illustrates, in block diagram form, the basic functional circuits internal to the ADA system 100 of FIG. 2. From the stereo signal cables 113 provided by the wall plate interface circuit of FIG. 3, the stereo (or music) signal is received by conventional pre-amplification and equalization circuit stages 170 and 172 and by threshold detection circuitry 174, the latter of which monitors the left and right stereo signal feeds 176 for low level audio signals. If the stereo signals are absent or at a negligible level, the detection circuitry 174 initiates a control signal, over feed 178, which instructs a selection/control circuit 180 to block any noise at the output of the equalization stages 172 from reaching the speakers.

A momentary closure of one of the two doorbell switches 106 will cause an intermittent doorbell signal to be received by the doorbell tone circuit 182. The doorbell tone circuit 182 will then generate two signals. The first is either a two-tone or three-tone sequence which will identify the doorbell switch 106 that initiated the doorbell signal. The second is a doorbell control signal that the selection/control circuit 180 uses to mute the stereo signal inputs 176 and unmute the two- or three-tone sequence 184 so that it can be coupled to the preamplifiers 188 and power amplifiers 190.

Figure 6A:
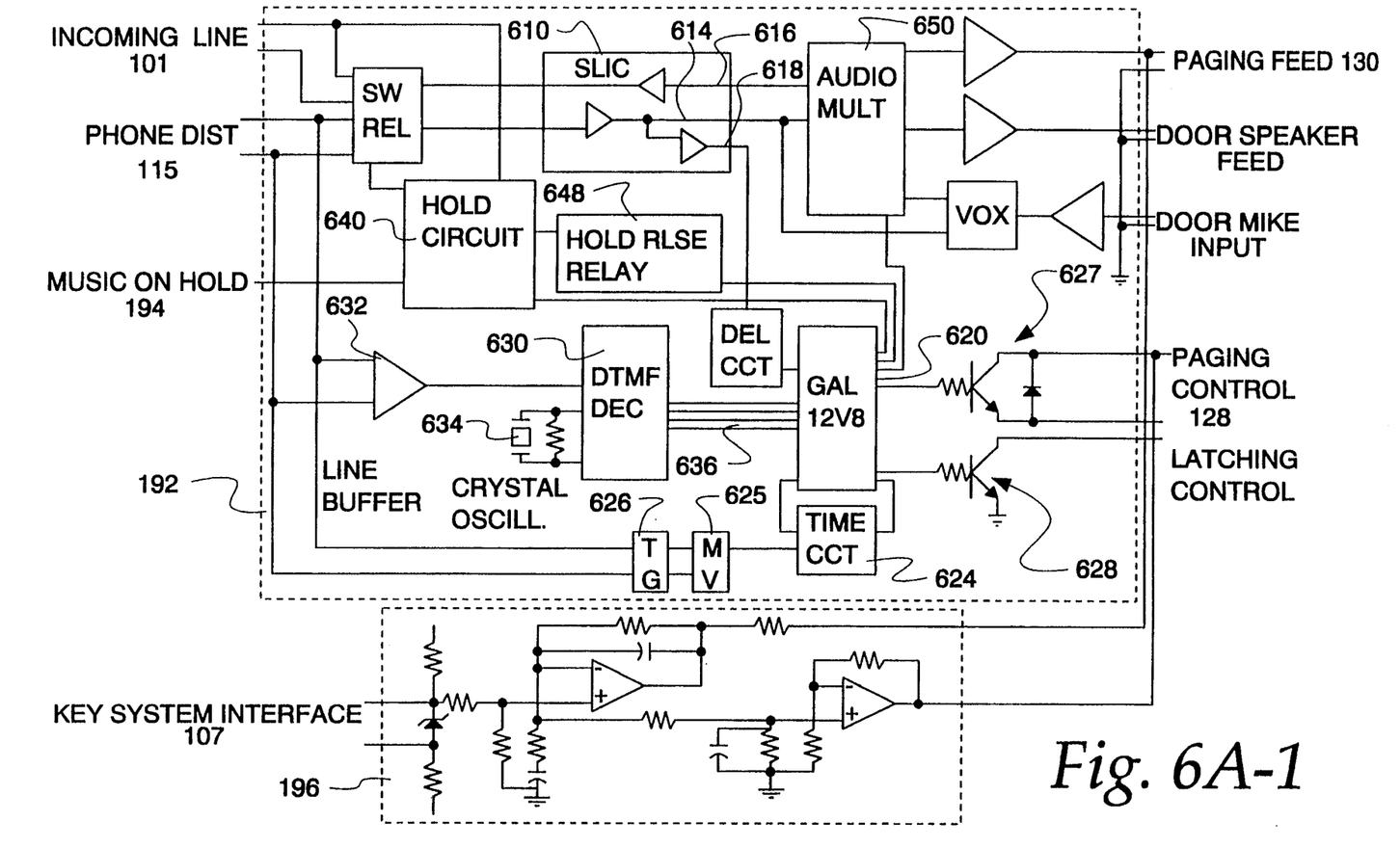
FIG. 6A is a circuit diagram illustrating a preferred embodiment of the communications module and doorbell circuit including interfaces for a telephone line, telephone station and key system, doorbell, door intercom, paging feed and control and the signalling, timing and control functions of FIG. 4.
FIG. 6B is a circuit diagram illustrating the doorbell generator circuit of FIG. 4.
Figure 6A:
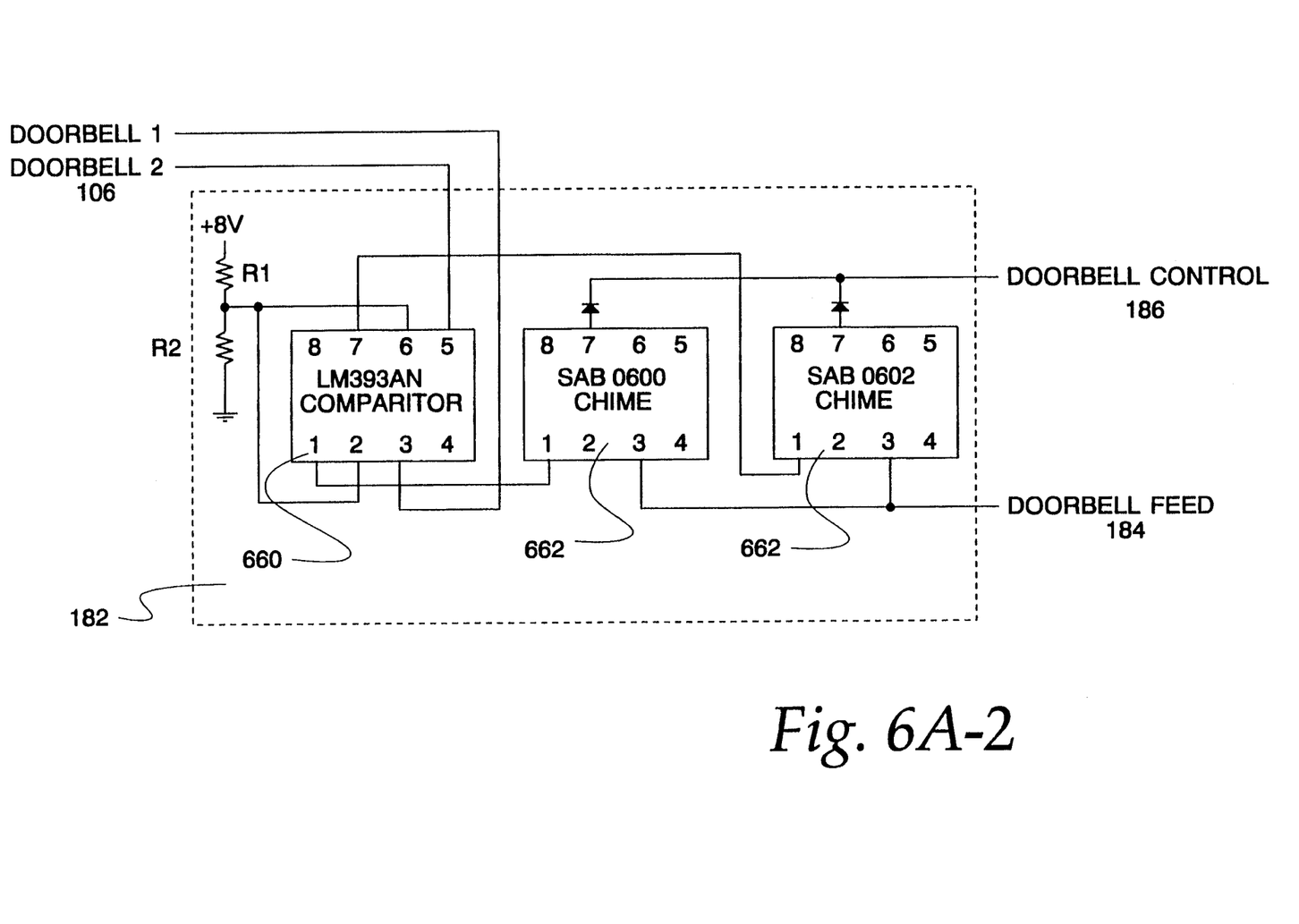

The incoming line 101 and the telephone distribution line 115 to the extensions are connected to the communications module 192. The incoming line 101 is normally bridged to the telephone distribution line 115. Upon the receipt of a predetermined DTMF code over the telephone distribution line 115, the communications module 192 performs the functions necessary to permit the handset 105 to be used to page, hold a private conversation with another handset, converse with someone at the door speaker controller 104, operate a latching device from the door speaker controller 104 and to put an incoming telephone call on hold. Upon receipt of the appropriate DTMF code (for example, #7) over the telephone distribution line 115, the communications module 192 uncouples the incoming telephone line 101 from the telephone distribution line 115 and couples the telephone distribution line 115 to the paging feed 130. The communications module 192 also generates a page control signal 129 to unmute the page signal input 130 into the selection and control circuit 180, so that it can be coupled to the preamplifiers 188 and power amplifiers 190.

Upon receipt of a second DTMF code after the initial code has been processed, the communications module 192 deactivates the page control signal 129, muting the paging feed 130. The telephone distribution lines 115 remain coupled to the communication module's internal SLIC 610 FIG. 6A), allowing the handset 105 to converse with another extension.

Upon receipt of a different DTMF code (for example, #3) over the telephone distribution lines 115, the communications module 192 uncouples the incoming telephone line 101 from the telephone distribution lines 115 and couples the telephone distribution lines 115 to the SLIC 610, allowing communication with the door speaker controller 104.

Upon receipt of a still different DTMF code (for example, *) after the previous code has been processed, the communications module activates a latching control signal to activate the door latching device connected to the door speaker controller 104. The door latching device remains active as long as the appropriate DTMF code is sent over the telephone distribution line 115.

Upon receiving a paging signal from the key system 107, the SLIC interface 610 generates a page control signal 129 that the selection/control circuit 180 uses to mute the stereo signal and unmute the page signal input 130 into the selection and control circuit 180, so that it can be coupled to the preamplifiers 188 and power amplifiers 190.

A conventional power supply/rectification circuit 210 may be used to convert the AC power levels to complementary DC power levels for the above described circuitry.

FIG. 4 further illustrates the signal selection/control circuit 180, which couples the selected stereo 176, unique tone sequence 184 and page signal 130 to the output amplifiers 188 and 190. When more than one control signal is presented to the selection/control circuit 180 simultaneously, the input signal with the highest priority is coupled to the speakers. The signal priorities for the illustrated embodiment are (from highest to lowest): page, doorbell, stereo and mute.

The output amplification stages 188 and 190 and the slave ADA output stage 108 are also illustrated by FIG. 4. The arrangement bridges the stereo signal cables 133, the doorbell feed and control 184, the paging feed 130 and paging control 129 leads to the slave ADA output leads. The arrangement uses conventional audio pre-amplification and power amplification circuitry 188 and 190 to distribute the selected information signal to speakers in a plurality of different zones A–D.

Figure 5:
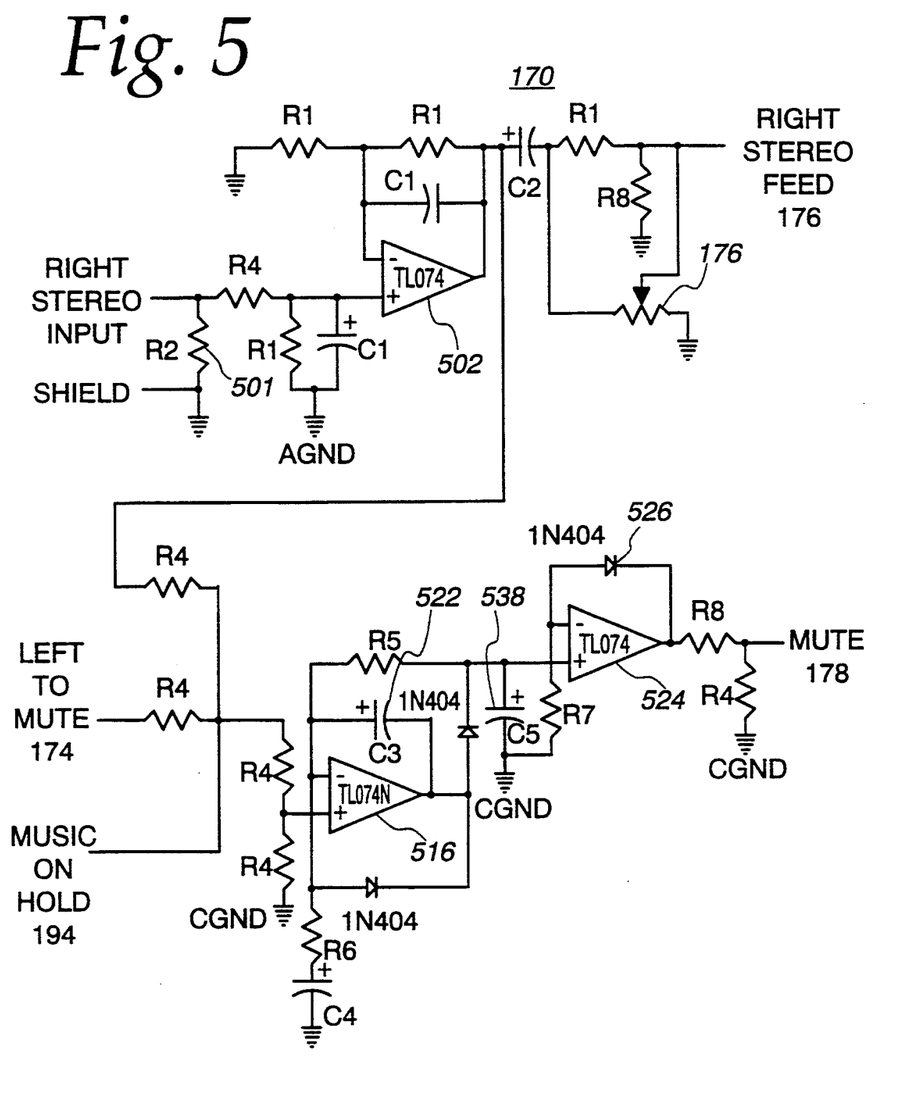
FIG. 5 is a circuit diagram illustrating a preferred embodiment of the stereo signal pre-amplification and equalization stages and the threshold detection circuitry of FIG. 4.

FIG. 5 illustrates a preferred circuit for implementing the stereo pre-amplification and equalization stages 170 and 172 and the threshold detection circuit 174 of FIG. 4. The illustrated stereo pre-amplification circuit 170 is one of two identical circuits used to convert a respective one of the left or right stereo signals from a balanced signal to a single-ended signal. The circuit includes a balanced termination resistor 501 and a conventionally arranged amplification circuit based around a TL074-type operational amplifier 502. The resistor and capacitor values in the pre-amplification circuit 170 of FIG. 5 may be calculated using $100\Omega$ for R1, $499\Omega$ for R2, $10K\ \Omega$ for R3 and 47 pf for C1.

The threshold detection circuit 174 monitors the left and right stereo signal lines 176 for low level audio signals. As previously noted, the DC control line 178 goes high when the stereo signal levels are absent or their levels become negligible. This instructs the selection/control circuit (180) to mute the stereo channel.

The threshold detection circuit 174 includes two summation resistors 512 and 514 and a TL074-type operational amplifier 516 in a buffered voltage-follower configuration. A capacitor 522 connected between the amplifier's output and negative input provides noise reduction for the stereo signal.

The final stages of the threshold detection circuit 174 includes a TL074 type operational amplifier 524, arranged for signal rectification and amplification. The diode 526 provides for rectification, while the capacitor 538 provides additional noise reduction. The resistor and capacitor values for the threshold detection circuit are 10K Ω for R4, 3.3M Ω for R5, 301Ω for R6, 2.21K Ω for R7, 20K Ω for R8, 10 pf for C3, 22 μf for C4 and 10 μf for C5.

FIG. 6A illustrates in block diagram form the basic functional connections between the ADA mother board 100 and the communications module 192, key systems interface circuit 196 and the doorbell generator board 182. The communications module 192 embodies a line interface circuit (SLIC) 610, a control circuit 620, a DTMF receiver 630, a hold and release circuit 640 and an audio multiplexor 650.

The SLIC 610 processes the audio signal received through the lines 115 by passing the signal through a Tx output 614 to the audio multiplexor 650 and the SHO output 618 to the control circuit 620. Signals received from the audio multiplexor 650 over an Rx input 616 are passed through the lines 115 to the telephone handset 105.

The control circuit 620 embodies a programmable logic device that processes signals received from the DTMF receiver 630. Also included is a delay and timing circuit 624 to activate a hold and switching relay circuit 640, the outputs to the paging control 128 and latching control 628 circuits. The tone circuit 626 is used to signal the handset 105 when a digit time-out occurs.

The DTMF receiver 630 processes DTMF signals from the handset 105 and passes these signals to the control circuit 620 in a hexadecimal format through output leads 636. A buffer 632 is placed between the lines 115 and the DTMF receiver for protection.

The release and hold circuit 640 includes a switching relay 642, a hold circuit with "music on hold" capability 194, a hold release relay 648 and a hold decay circuit.

The audio multiplexor 650 is used to switch voice and control signals between the SLIC circuitry 610, the paging and control circuits 652, as well as the door speaker, mike and control circuits 656. The VOX circuit 654 is used to control feedback on the front door intercom associated with the door speaker controller 104.

Figure 6B:
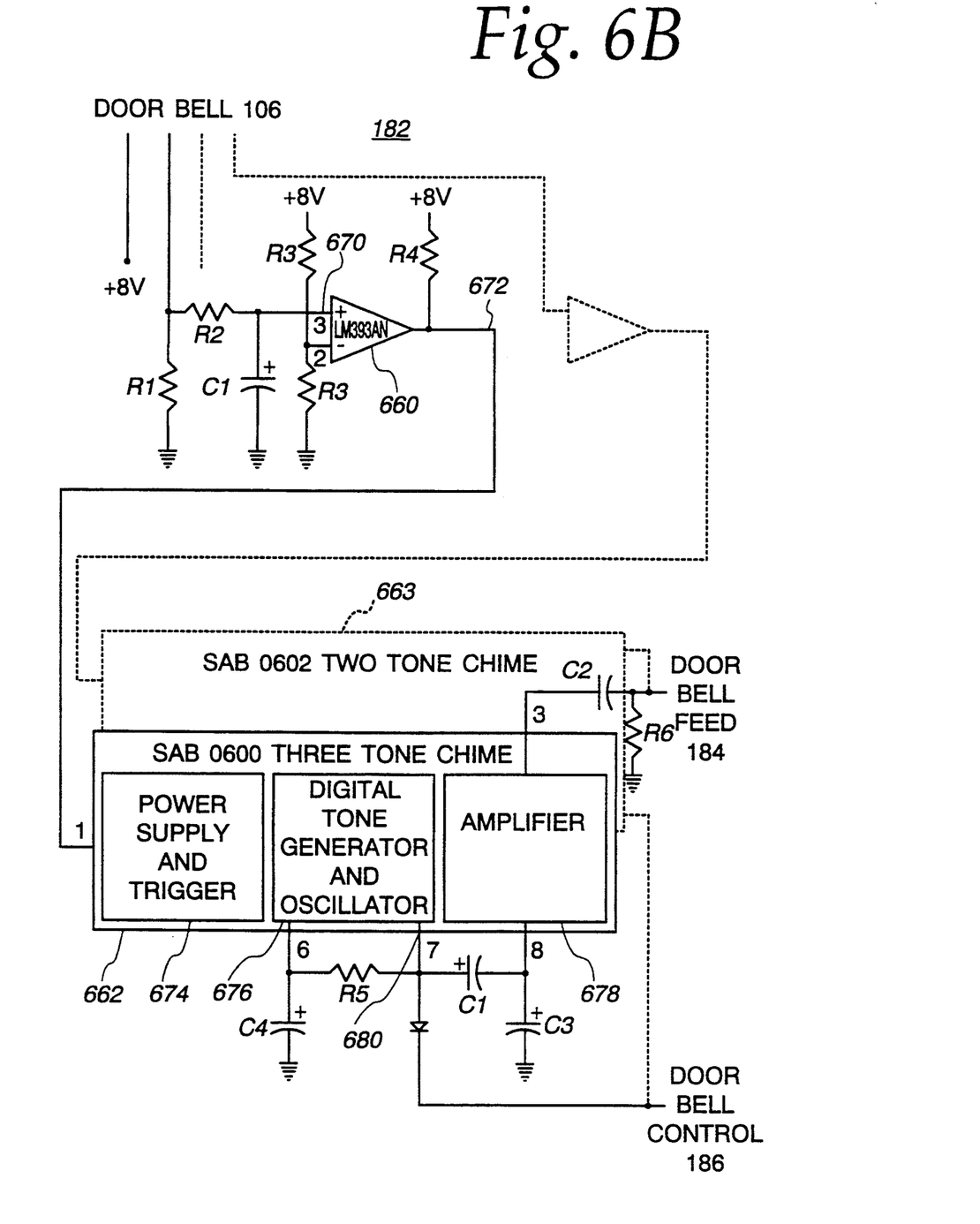

FIG. 6B, which illustrates a preferred circuit embodiment of the doorbell generator board 182, includes an LM 393AN Comparitor 660, an SAB0060 Three Tone Chime 662 and/or an SAB0062 Two Tone Chime 663. With the intermittent closure of one of the two doorbell switches 106, the power provided to input 670 of the comparitor 660 is increased over the reference voltage at input 672, transmitting a triggering voltage into the chime 662. The trigger 674 activates the digital tone generator 676, which applies tones to an amplifier 678. The output of the amplifier 678 is transmitted to the doorbell feed 184. Simultaneously, the trigger 674 applies voltage to tone generator pin 680, which is held for the duration of the tone sequence. This voltage is used as the doorbell control voltage 186. When the tone sequence is completed, the output voltage from 680 is lowered to 0 volts, disabling the control signal 186 and the Chime 662.

The Chime 662, which is manufactured by Siemens AG of Germany, is a single chip that produces a sound signal according to the tempo, rhythm and tones programmed by the manufacturer when triggered by a DC signal. The SAB 0600 emits a three tone chime when triggered and the SAB 0602 emits a two tone chime when triggered. As will be apparent to one of ordinary skill in the art, the SAB 0602 may be used in place of the SAB 0600. Similarly, the SAB 0602 may be used to produce the tone associated with one doorbell button 106 and the SAB 0600 may be used to produce the tone associated with a different doorbell button 106 in the same system. Resistor and capacitor values in the doorbell circuit illustrated in 6B are 68Ω (1 watt) for R1, 47.5Ω for R2, 100Ω for R3, 1 kΩ for R4, 37.5 kΩ for R5, 10 kΩ for R6, 0.1 μf for C1, 0.22 μf for C2, 0.47 μf for C3 and 0.0047 μf for C4. An LM317T is provided in the doorbell circuit to reduce the +15 V DC input voltage to the required +8 V DC operating voltage.

The following examples are given to clarify the operation of the system of the present invention. When a handset 105 is taken "off hook" and a predetermined code is dialed on the telephone handset (for example, #), signals are sent from the DTMF receiver 630 to the GAL 620 (FIG. 6A), which starts a timer 624. The timer 624 counts a timing period of 4 seconds within which a second digit must be received from the handset 105. If the second digit is not received within the 4 second period, the tone circuit signals the extension user that time has expired and the GAL 620 will reset. If a second digit is received within 4 seconds and is one of a predetermined group (for example, a 1,2,5,6,8,9, 0,#,*), the GAL 620 will reset.

If the second digit is, for example, a 3, and the PH1 lead is in a Hi state, the GAL 620 will signal the DRM which signals the SLIC 610. The GAL 620 also fires an SCR in the Hold Circuit 640, and activates a line relay to switch the extensions to the internal SLIC 610.

If the second digit is, for example, a 7, and the PH1 lead is in a Hi state, the GAL 620 will set the TX input 614 from the SLIC 610 to the Audio Multiplexor 650 to the Page 654 circuit. The GAL 620 will also fire the SCR in the Hold Circuit 640 and activate a line relay to switch the extensions to the internal SLIC 610.

If the second digit is, for example, a 4, and the PH1 lead is in a Hi state the GAL 620 will disable the possible activation of the release circuit 646 whenever the extension goes "on hook." The GAL 620 will fire the SCR in the Hold Circuit 640 and activate a line relay to switch the handset 105 to the internal SLIC 610.

If a third digit is dialed and is, for example, a 1,2,5,6,8,9, or #, the GAL 620 will reconnect the handset 105 to the telephone line 101.

If the third digit is, for example, a 3 and the GAL 620 is in the DRM state, no change will occur. If the GAL 620 is not in the DRM state it will reset, clear the PGM, DRM, PGC, INT and HLD leads and reconnect the handset 105 to the telephone line 101.

If the third digit is, for example, a 4 and the GAL 620 is in the HLD state, no change will occur. If the GAL 620 is not in the HLD state, it will reset, clear the PGM, DRM, PGC, INT and HLD leads and reconnect the handset 105 to the telephone line 101.

If the third digit is, for example, a 7 and the GAL 620 is in the PGM state, no change will occur. If the GAL 620 is not in the PGM state, it will reset, clear the PGM, DRM, PGC, INT and HLD leads and reconnect the handset 105 to the telephone line 101.

If the third digit is, for example, a 0 and the GAL 620 is in the PGM state, the PGC lead will go Lo, disabling the page control 626. If the GAL 620 is not in the PGM state, it will reset, clear the PGM, DRM, PGC, INT and HLD leads and reconnect the handset 105 to the telephone line 101.

If the digit is, for example, a * and the GAL 620 is in the DRM state, the DRL lead goes from Lo to Hi, activating the Latch Control 628 as long as the "*" button is depressed. If the GAL 620 is not in the DRM state it will reset, clear the PGM, DRM, PGC, INT and HLD leads and reconnect the handset 105 to the telephone line 101.

If an extension goes "on hook," a multivibrator fires over the HKP lead. If the HLY lead is Lo (normal state), the CLR lead sets form Hi to Lo, disabling the hold release relay 648. The GAL 620 will reset, clear the PGM, DRM, PGC, INT and HLD leads and reconnect the handset 105 to the telephone line 101.

If the HLY lead is Hi the CLR lead will not change state and the hold release relay 648 will remain active. The GAL 620 will reset, clear the PGM, DRM, PGC, INT and HLD leads.

The Hold Circuit 640 is released whenever one of four conditions occurs: (1) the other party disconnects (2) the Central Office releases the line (3) an extension goes "off hook" or (4) a default digit is dialed.

Figure 7A:
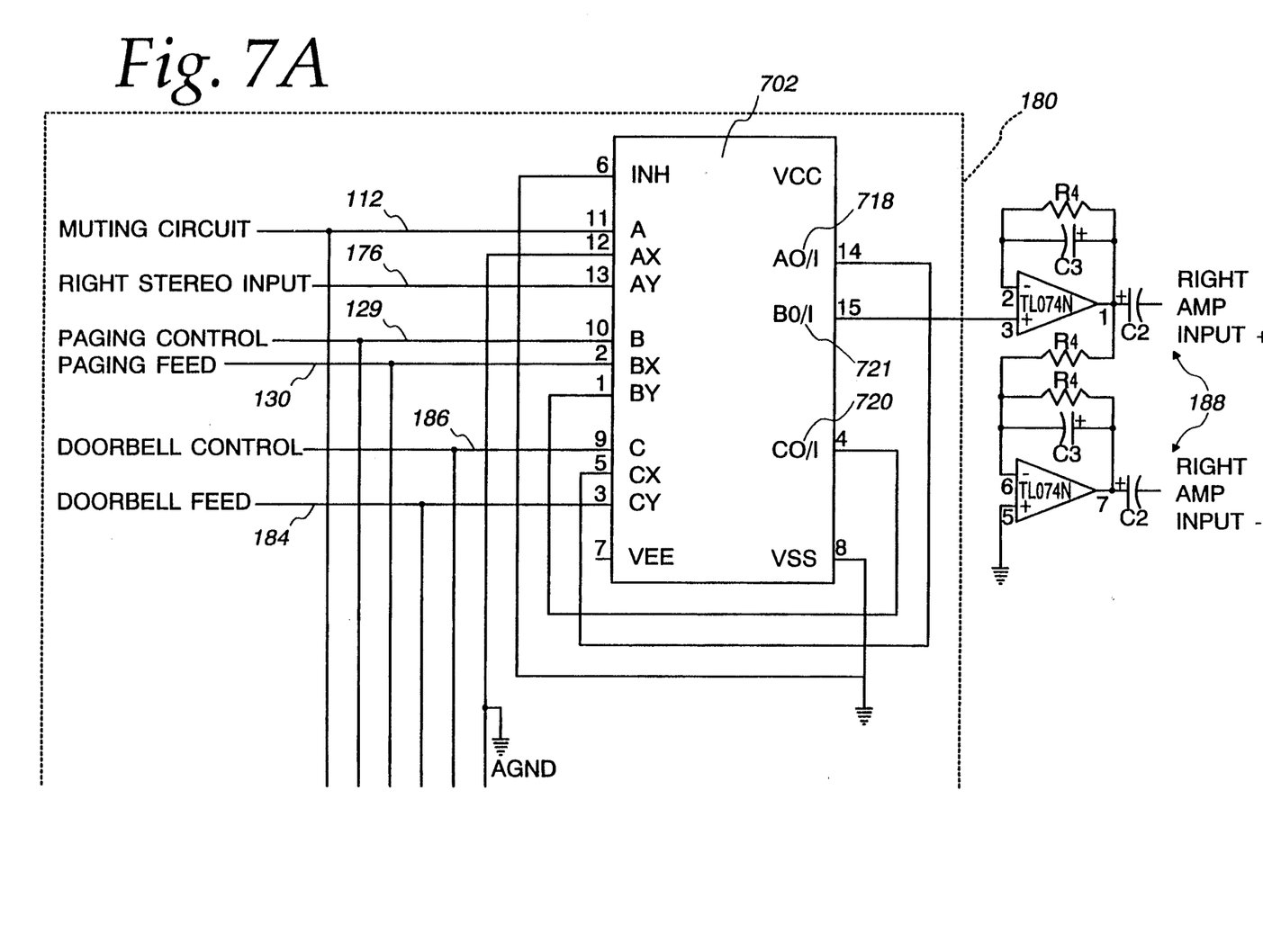
Figure 7B:
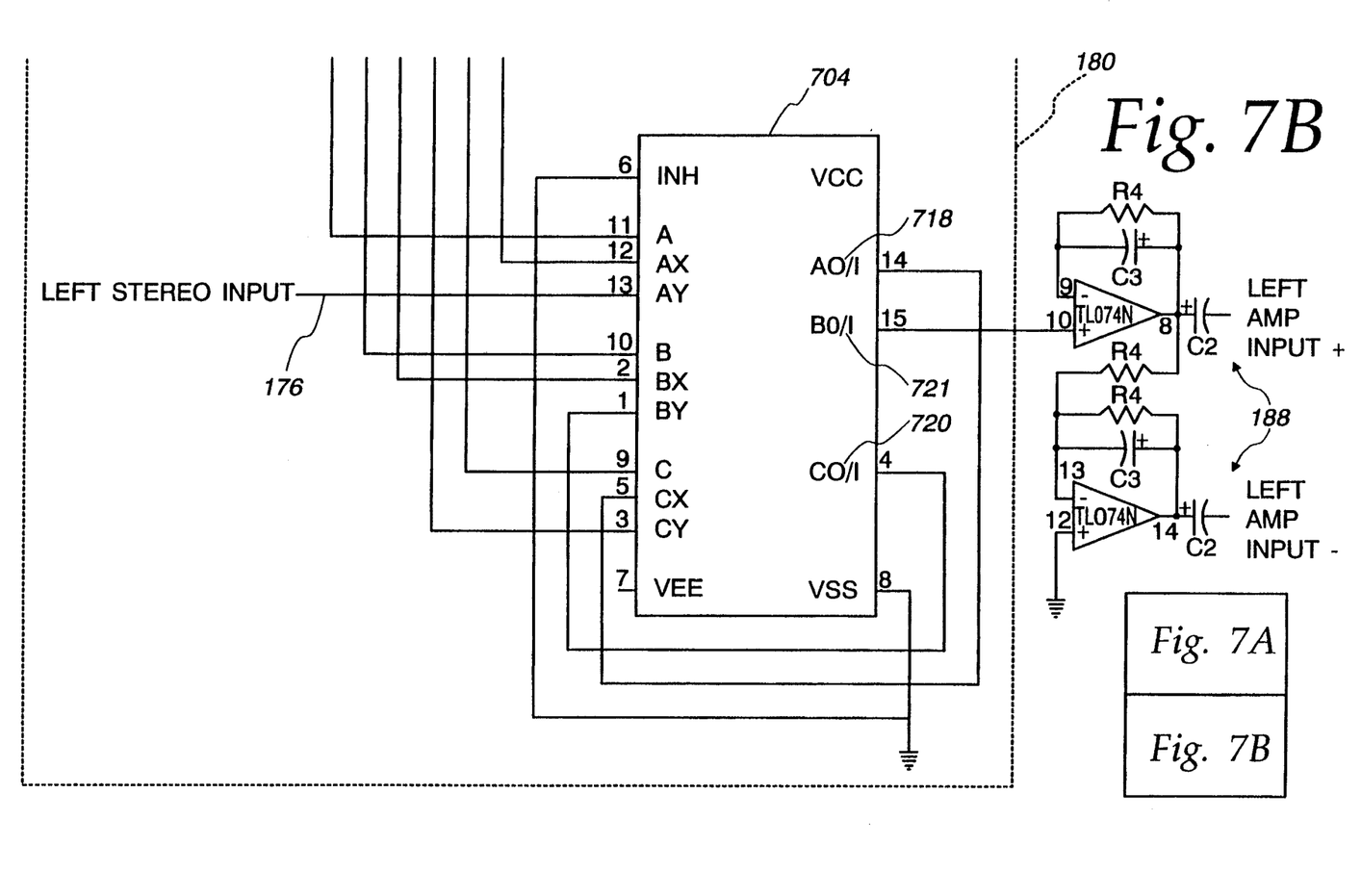

Referring now to FIG. 7, the signal selection/control circuit 180 is illustrated as including two 4053-type multiplexor 702 and 704 and the pre-amplifiers 188. If no stereo signals are present, the threshold detection circuitry 174 of FIGS. 4–5 will supply a threshold control signal 178.

Each identical left and right multiplexor 702 and 704 is controlled by the mute function, the doorbell control signal 186 and the page control signal 129 by the respective A 0/1, B 0/0 and C 0/1 control inputs. As feed inputs, each multiplexor 702 and 704 receives left or right stereo signal feeds 176 (FIG. 4) at the Ay input, ground at the Ax input, the page signal 130 at the Bx input and the doorbell tone sequence 184 at the Cy input. The Cx input receives the A 0/1 output and the By input receives the C 0/1 output, with the B 0/1 output being provided to the pre-amplification circuit 188 for priority control. Any audio received at the output (B 0/1) 720 of the multiplexors is converted from a single-ended signal to a balanced signal using the conventional pre-amplification circuitry 188 shown in FIG. 7.

In accordance with this configuration, if the mute switch 112 is closed, the multiplexors 702 and 704 will choose input Ax and effectively mute the stereo inputs. Otherwise, the multiplexors will pass the stereo signals through to the output (A 0/1) 718, to the output (C 0/1) 720 and then to the output (B 0/1) 721 of the multiplexors.

If a doorbell control signal 186 is present, the multiplexors will pass the doorbell tone sequence 184 to the output (C 0/1) 720 and then to the output (B 0/1) 721 of the multiplexor (provided the page control signal 186 is not present). If a doorbell control signal 186 is not present, the multiplexors will pass the output (A 0/1) 718 to the output (B 0/1) 720.

If a page control signal 129 is present, the multiplexors will pass the page signal 130 to the output (B 0/1) 721 of the multiplexor (regardless of the presence of any other signals). If a page control signal 129 is not present, the multiplexors will pass the output (C 0/1) 720 to the output (B 0/1) 720.

Figure 8:
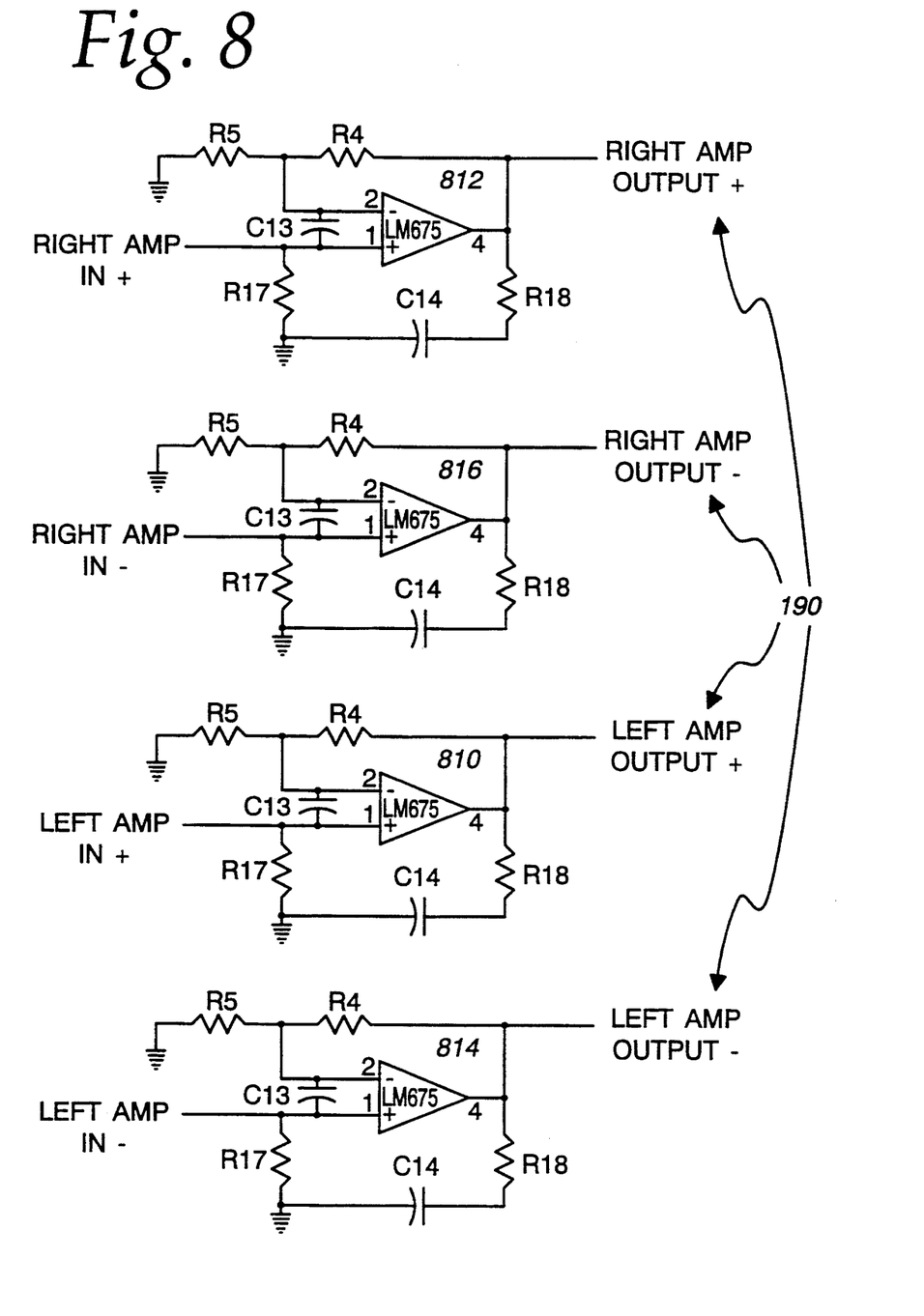
FIG. 8 is a circuit diagram illustrating a preferred embodiment of the audio signal output power amplification circuit of FIG. 4.

FIG. 8 illustrates the power amplification circuit 190 of FIG. 4 as including four identical LM675-type power amplifiers 810, 812, 814 and 816. The gain of each amplifier is 20. The resistor and capacitor values in the power amplification circuit 190 of FIG. 4 are preferably as follows: 10 kΩ for R4, 1 kΩ for R5, 22 kΩ for R17, 1Ω (1 Watt) for R18, 0.1 micro-farad for C14 and 100 pf for C13.

Figure 9:
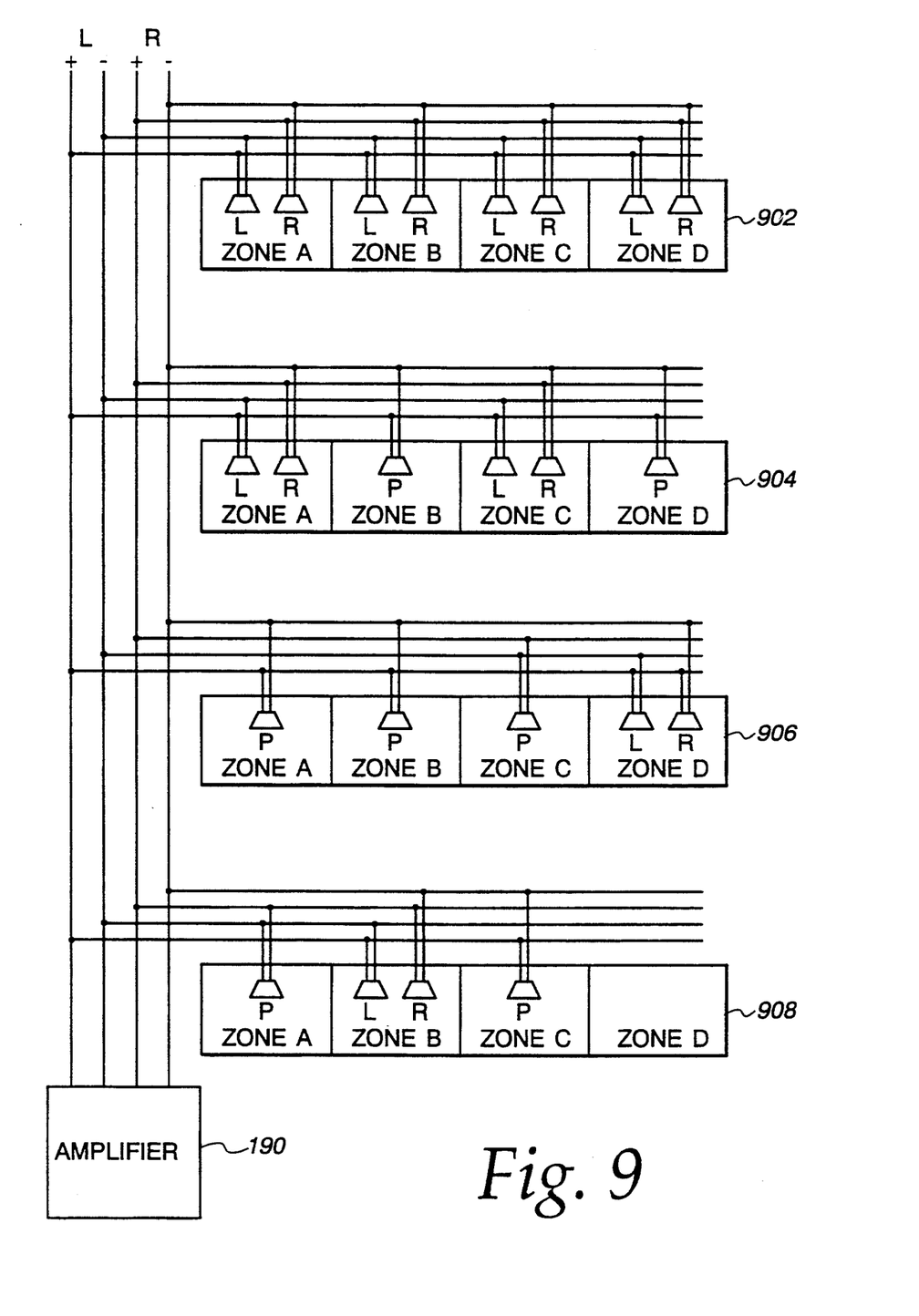
FIG. 9 is a diagram illustrating four preferred speaker hook-up configurations.

FIG. 9 demonstrates four exemplary alternative hook-up configurations 902, 904, 906, 908 for lines running from the amplifiers 190 to the speakers located in each of the zones A–D. Because the output amplifiers 109 are in a balanced bridgeable output configuration, the bridgeable left and right output amplifiers 109 can accommodate left, right and left plus right speaker hook-up configurations. Preferably, each speaker has its own volume control located within the room where that speaker is placed.

Figure 10:
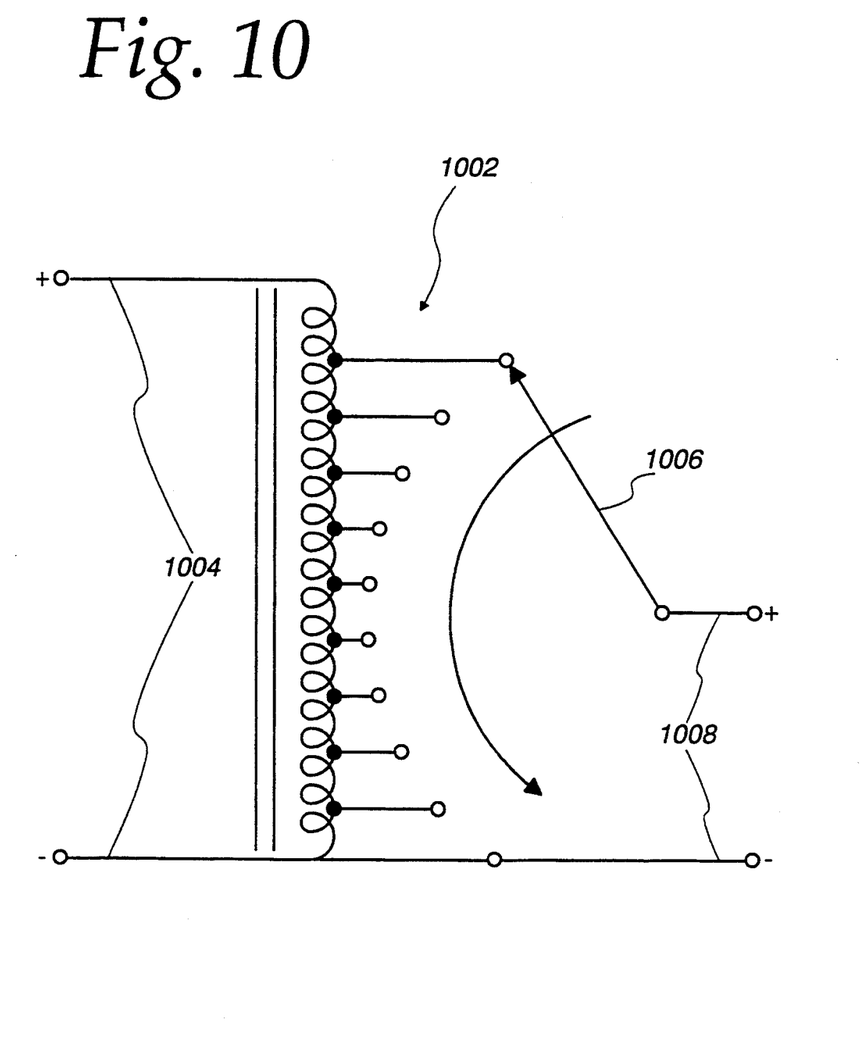
FIG. 10 is a diagram illustrating a volume control audio transformer in accordance with the present invention.

As shown in FIG. 10, an audio transformer configuration 1002 is preferably used to provide volume control. The amplifiers 109 connect to the inputs 1004 of the audio transformers 1002. The 10 position selector switch 1006 provides adjustability from zero to full volume. The output of each audio transformer 1008 then feeds a corresponding speaker. Due to the use of four Ω speakers, the volume control audio transformer has a built-in six decibels of attenuation so that the impedance presented to the ADA system from each transformer with a four Ω speaker is not less than sixteen Ω. Unless otherwise indicated, component values represented by the same notation from the different figures (e.g., R1, C50) are the same.

What is claimed is:

1. A signal distribution and communication arrangement for controlling broadcast of a plurality of different types of signals through speakers located in various zones, comprising:
   a door speaker controller to a telephone to allow communication between said telephone and a door speaker;
   for broadcasting over said speakers located in various zones from said telephone and thereafter muting the broadcast over said speakers located in various zones to allow private communication;
   said broadcasting circuit further including means for placing a phone call on hold when said broadcasting said over said speakers located in various zones is originated.

2. The signal distribution and communication arrangement of claim 1, wherein said door speaker controller is accessed from said telephone by transmitting a predetermined sequence of at least a single digit from said telephone.

3. The signal distribution and communication arrangement of claim 1, wherein communication between said telephone and said door speaker is originated by transmitting a predetermined sequence of at least a single digit from said telephone.

4. The signal distribution and communication arrangement of claim 1, wherein communication between said telephone and said speakers in various zones is originated by transmitting a predetermined sequence of at least a single digit from said telephone.

5. The signal distribution and communication arrangement of claim 4, wherein said broadcast is muted by transmitting a predetermined sequence of at least a single digit from said telephone.

6. The signal distribution and communication arrangement of claim 1, wherein a call is placed on hold by transmitting a predetermined sequence of at least a single digit from said telephone.

7. The signal distribution and communication arrangement of claim 1, wherein said phone call may be resumed after said broadcasting is completed by transmitting a predetermined sequence of at least a single digit from said telephone.

8. A signal distribution and communication arrangement for controlling the broadcast of a plurality of different types of signals through speakers located in various zones comprising;

an audio receiver for receiving a substantially continuously generated signal;

a tone generator circuit, responsive to at least one doorbell generator signal, for generating a predetermined tone;

a line interface circuit that is responsive to a page signal received over associated signal lines;

an amplifier circuit, coupled to the speakers, which amplifies at least the substantially continuously generated signal for broadcast through the speakers;

a control circuit which, in response to the audio receiver, to the tone generator circuit and to the line interface circuit, controls which of the substantially continuously generated signal, the predetermined tone and the page signal should be broadcast through the speakers;

means for connection to a door speaker to allow for communication between a door speaker and said telephone and to permit the activation of a door latching device by the said telephone; and means for broadcasting over said speakers located in various zones from said telephone and for thereafter muting the broadcast over said speakers located in various zones to allow private communication;

said broadcasting means further including means for placing a phone call on hold when said broadcasting over said speakers located in various zones is originated.

9. The signal and distribution and communication arrangement of claim 8 wherein the communications module is activated from said telephone by transmitting predetermined sequences of at least a single digit from said telephone.

10. The signal distribution and communication arrangement of claim 8, wherein communication between said telephone and said door speaker is originated by transmitting a predetermined sequence of at least a single digit from said telephone.

11. The signal distribution and communication arrangement of claim 8, wherein communication between said telephone and said speakers in various zones is originated by transmitting a predetermined sequence of at least a single digit from said telephone.

12. The signal distribution and communication arrangement of claim 11, wherein said broadcast is muted by transmitting a predetermined sequence of at least a single digit from said telephone.

13. The signal distribution and communication arrangement of claim 8, wherein a call is placed on hold by transmitting a predetermined sequence of at least a single digit on said telephone.

14. The signal distribution and communication arrangement of claim 8, wherein said phone call may be resumed after said broadcasting is completed by transmitting a predetermined sequence of at least a single digit from said telephone.

15. A signal distribution and communication arrangement for controlling the broadcast of a plurality of different types of signals through speakers located in various zones, comprising:

an audio receiver circuit which responds to a music signal from an external music source, said audio receiver circuit including a threshold detection circuit which provides a music mute function in response to the music signal not exceeding a predetermined signal magnitude;

wherein the threshold detection circuit creates a threshold detection control signal which disables the music mute function in response to the music signals exceeding a predetermined signal magnitude;

a page interface circuit, responsive to a page signal generated from a telephone handset, which generates a paging control signal, serves as a power source to the telephone handset and processes an audio signal from the telephone handset;

a doorbell interface circuit responsive to a single doorbell source that may be activated by any one of a plurality of doorbell switches, said doorbell interface circuit generating a doorbell control signal and a two-tone sequence identifying the doorbell switch that activated the doorbell source;

an amplifier circuit, coupled to the speakers, which amplifies the page signal, the music signal and said one of the doorbell tone sequences for broadcast by the speakers in each of the zones; and a control circuit, responsive to the audio receiver circuit and to the page and doorbell interface circuits, which selects and couples one of the music signal, the page signal and said two-tone sequence to the amplifier circuit.

16. A signal distribution and communication arrangement, according to claim 15, wherein the doorbell interface circuit includes a voltage controlled oscillator having a voltage which is sequentially varied, in response to said doorbell signal source, to produce said two-tone sequence.

17. A signal distribution and communication arrangement, according to claim 16, further including a clock circuit which generates an oscillating signal, a sequencer circuit which responds to the oscillating signal by generating a sequence of output signals and a resistor summation circuit which responds to the sequencer circuit by providing a corresponding voltage to the voltage controlled oscillator.

18. A signal distribution and communication arrangement, according to claim 15, wherein the threshold detection circuit provides a signal to the control circuit, which signal indicates when the music signal is below a prescribed signal magnitude.

19. A signal distribution and communication arrangement, according to claim 15, wherein the page interface circuit equalizes the audio signal from the telephone handset.

20. A signal distribution and communication arrangement for controlling the broadcast of a plurality of different types of signals, including audio signals from at least one telephone handset, through speakers located in various zones, comprising:

an audio receiver circuit which responds to a music signal from an external music source, wherein the audio receiver circuit includes:

(a) a wall plate interface circuit with a signal interruption switch and a gain adjust control for respectively interrupting and adjusting the gain of the music signal, (b) an automatic equalization circuit which compensates the music signal for reduced volume levels and frequency response roll-off; and (c) a threshold detection circuit which provides a music mute function in response to the music signal not exceeding a predetermined signal magnitude, wherein the threshold detection circuit creates a threshold detection control signal which disables the music mute function in response to the music signals exceeding a predetermined signal magnitude;

a page interface circuit, responsive to a short-lived page signal and a page audio signal both generated from said at least one telephone handset, which generates a paging control signal and serves as a power source to the telephone in response to the short-lived page signal being received and passes at least the page audio signal from the telephone handset, wherein the page line interface circuit provides feedback control for the page audio signal to prevent positive feedback of the page audio signal;

a doorbell interface circuit responsive to a single doorbell source that may be activated by any one of a plurality of doorbell switches, said doorbell interface circuit generating a doorbell control signal and a two-tone sequence identifying the doorbell switch that activated the doorbell source;

an amplifier circuit, coupled to the speakers, which amplifies at least the music signal and said two-tone sequence for broadcast by the speakers in each of the zones; and a control circuit, responsive to the audio receiver circuit and to the page and doorbell interface circuits, which selects and couples one of the music signal, the page signal and said two-tone sequence to the amplifier circuit.

21. A signal distribution and communication arrangement, according to claim 20, wherein the control circuit, in response to more than one of the music signal, the page signal and said one of the doorbell tone sequences being received together, prioritizes these signals so that the page signal has highest priority, said two-tone sequence has intermediate priority and the music signal has lowest priority.

22. A signal distribution and communication arrangement, according to claim 20, wherein arrangement includes means of providing each speaker with its own volume control located near one of the speakers.

23. A signal distribution and communication arrangement for controlling the broadcast of a plurality of different types of signals through speakers located in various zones, comprising:

an audio receiver circuit which responds to a music signal from an external music source, said audio receiver circuit including a threshold detection circuit which provides a music mute function in response to the music signal not exceeding a predetermined signal magnitude;

wherein the threshold detection circuit creates a threshold detection control signal which disables the music mute function in response to the music signals exceeding a predetermined signal magnitude;

a page interface circuit, responsive to a page signal generated from a telephone handset, which generates a paging control signal, serves as a power source to the telephone handset and processes an audio signal from the telephone handset;

a doorbell interface circuit responsive to a single doorbell source that may be activated by any one of a plurality of doorbell switches, said doorbell interface circuit generating a doorbell control signal and a two-tone sequence identifying the doorbell switch that activated the doorbell source;

an amplifier circuit, coupled to the speakers, which amplifies the page signal, the music signal and said one of the doorbell tone sequences for broadcast by the speakers in each of the zones;

a control circuit, responsive to the audio receiver circuit and to the page and doorbell interface circuits, which selects and couples one of the music signal, the page signal and said two-tone sequence to the amplifier circuit;

a door speaker controller adapted to be connected to a telephone to allow communication between said telephone and a door speaker; and means for broadcasting over said speakers located in various zones from said telephone and for thereafter muting the broadcast over said speakers located in various zones to allow private communication.

24. The signal and distribution and communication arrangement of claim 3 wherein a door latching device can be activated by transmitting a predetermined sequence of at least a single digit from said telephone.

* * * * *